United States Patent
Dotson et al.

(10) Patent No.: US 10,650,300 B2
(45) Date of Patent: May 12, 2020

(54) COMPONENT-BASED DECISION-MAKING WITH CENTRALIZED OFFICIATING AND THE MODIFICATION OF THOSE DECISIONS THROUGH SUCCESS MEASUREMENTS

(71) Applicant: Nova Dynamics, LLC, Philomath, OR (US)

(72) Inventors: Luke Dotson, Austin, TX (US); Joseph Sullivan, Philomath, OR (US)

(73) Assignee: Nova Dynamics, LLC, Philomath, OR (US)

( * ) Notice: Subject to any disclaimer, the term of this patent is extended or adjusted under 35 U.S.C. 154(b) by 362 days.

(21) Appl. No.: 15/361,045

(22) Filed: Nov. 24, 2016

(65) Prior Publication Data

US 2017/0147948 A1    May 25, 2017

Related U.S. Application Data

(60) Provisional application No. 62/259,152, filed on Nov. 24, 2015.

(51) Int. Cl.
*G06N 3/00* (2006.01)

(52) U.S. Cl.
CPC ................... *G06N 3/008* (2013.01)

(58) Field of Classification Search
CPC ........... G05B 2219/14123; G05B 2219/49143; B62D 15/0265; B60G 2800/965
See application file for complete search history.

(56) References Cited

U.S. PATENT DOCUMENTS

| | | | |
|---|---|---|---|
| 5,058,024 A | 10/1991 | Inselberg | |
| 5,285,380 A * | 2/1994 | Payton | G05B 9/03 700/69 |
| 5,559,511 A | 9/1996 | Ito et al. | |
| 5,787,262 A | 7/1998 | Shakib | |
| 5,806,074 A | 9/1998 | Souder et al. | |
| 5,884,075 A | 3/1999 | Hester et al. | |
| 5,889,953 A | 3/1999 | Thebaut et al. | |
| 6,205,397 B1 | 3/2001 | Eslambolchi | |
| 6,490,522 B2 | 12/2002 | Sugiyama | |
| 7,076,409 B2 | 7/2006 | Agrawala | |

(Continued)

OTHER PUBLICATIONS

Rosenblatt, Julio K., DAMN: A Distributed Architecture for Mobile Navigation, 1995, AAAI Technical Report SS-95-02 (Year: 1995).*

(Continued)

*Primary Examiner* — Daniel Swerdlow
(74) *Attorney, Agent, or Firm* — DASCENZO Intellectual Property Law, P.C.

(57) ABSTRACT

A method for decision-making by an electronic system comprising a plurality of components is provided herein. The components of the system are given tunable voting authority v=[Vmin . . . Vmax], typically [−1 . . . 1]. A singleton officiating member manages the notification and voting process. A current representation of the entire system is stored in the model. The model is a state storage system that tracks the existence and condition of a group of tracked data items, called Entities. The model is managed by the singleton officiating member but may be queried by any component.

14 Claims, 2 Drawing Sheets

(56) References Cited

U.S. PATENT DOCUMENTS

| | | |
|---|---|---|
| 7,430,261 B2 | 9/2008 | Forest et al. |
| 7,565,419 B1 | 7/2009 | Kwiatkowski |
| 9,227,632 B1 * | 1/2016 | Lee .................. B60W 30/0953 |
| 2003/0220966 A1 | 11/2003 | Hepper et al. |
| 2015/0081187 A1 * | 3/2015 | Solyom .................. B60K 31/00 |
| | | 701/70 |

OTHER PUBLICATIONS

U.S. Appl. No. 09/668,484, filed Dec. 3, 2002, Dror Lapidot Jonathan Silverberg.

* cited by examiner

COMPONENT-BASED DECISION-MAKING WITH CENTRALIZED OFFICIATING AND THE MODIFICATION OF THOSE DECISIONS THROUGH SUCCESS MEASUREMENTS

CROSS REFERENCES TO RELATED APPLICATIONS

This application claims priority to U.S. Provisional Patent Application Ser. No. 62/259,152 filed on Nov. 24, 2015 entitled "Product Delivery System and Apparatus", the disclosure of which is hereby incorporated by reference.

BACKGROUND OF THE INVENTION

The present invention relates generally to decision making within a computer operating system, and more particularly, to a method for deciding by allowing components of a system to cast a vote and modifying future decisions by measuring the success of previous decisions.

BACKGROUND ART

Computer systems have forever changed modern society and industry. In recent times, technological innovations relating to computers have increasingly become intertwined with daily activities. For example, it has become commonplace for humans and machines—such as computers, to interact and/or communicate in order to affect real-world outcomes. Many of these interactions involve transactions wherein computers are directed by humans via some form of communications input such as from keyboards, speech, and/or vision sensors. As an example, it is common to interact over the telephone with a voice-activated system to conduct transactions associated with airline travel, banking, and shopping to name but a few applications.

A common frustration with human-machine interactions relates to machines making improper choices based upon uncertain/ambiguous factors in their environment. Many conventional systems fail to adequately account for uncertainty, however. These systems will often erroneously conduct transactions and/or affect real world outcomes with little or no consideration regarding the costs associated with making a mistake. These systems also generally fail to assess internal states of uncertainty before making their decisions. Another problem associated with conventional systems is that decisions are generally treated as independent events wherein previous decisions are generally unaccounted for when determining a choice for a present decision. This also may lead to increased errors and thus frustration between humans and computers.

The present invention relates to a program and method for facilitating decision-making, and more particularly, the present invention relates to a system and method that accepts scaled votes that bear on a decision in a structured format from a plurality of sources and evaluates the success of those decisions to modify future decisions.

Representative systems of governance typically compromise the rights of individuals to participate in decision making processes. Whether applied to government agencies, legislative bodies, corporations, or other institutions and organizations, representative government is predicated upon the election of a small number of representatives who are given plenary power to vote on matters affecting their constituents. In such systems, complex decisions that affect resource allocation, rulemaking, and other matters, are undertaken by a small number of decision-makers who act on behalf of a larger group.

As a significant disadvantage, voters are commonly required to pick a single outcome for all decisions, and, conversely, no voter is able to scale the intensity of his or her voting power when voting on each of the various matters submitted to a vote. As another disadvantage, current systems typically require a yes/no vote on an issue coupled to a majority-determined outcome, while an alternative decision may satisfy the present situation as measured by previous success or failure. Furthermore, current governance systems do not easily allow for an individual moderator to propose alternative decisions or to set parameters by which decisions will be considered.

One reason that traditional collective decision-making processes may not provide optimal solutions is that the method of decision making is static and cannot be easily modified if it produces results that are less than optimal. The inadequate nature of current decision systems has resulted in errors being made which is evidenced by low voter participation rates.

There remains a need for a participatory form of governance that can be used in a computer-based system that preserves individual participation of the components of the system while permitting the components to scale their participation when voting for some or all the decisions of a facing the system. The form of governance must also allow voting optimization based on review of previous outcomes.

Accordingly, it is an object of the present invention to provide an improved system and method that can facilitate decision-making within a computer system, particularly when the decision-making utilizes scaled votes from components of the system. It is a further object, to provide a method wherein voting assessment can be effectively utilized in future decision-making processes.

BRIEF SUMMARY OF THE INVENTION

The present invention provides a method for decision-making by an electronic system comprising a plurality of components. The components of the system, herein referred to as "chips" are given tunable voting authority v= [Vmin . . . Vmax], typically [−1 . . . 1]. The overall system is very similar to a public body such as a governmental House. Many different members may propose conflicting or concurrent resolutions (proposal), each proposal comprising a set of instructions (Action). They vote on each resolution and the winning resolutions are acted upon.

A singleton officiating member, herein referred to as the "cortex", manages the notification and voting process. When the cortex loads, it inventories the chips and spawns new threads as necessary. Each chip functions as an independent intelligence. A current representation of the entire system is stored in the model. The model is a state storage system that tracks the existence and condition of a group of tracked data items, called Entities. The model is managed by the cortex but may be queried by any chip.

chips may also ship with optional important constructs, for example: 1. action drivers. Action drivers are programming to enable certain functions or drive specific hardware thereby allowing a chip to not only suggest a particular proposal but also provide for executing relevant actions if the proposal passes vote. Action vocabulary is a set of unique actions "A" generated from all action drivers. 2.

Success centers that measure the success or positiveness of a particular situation, and 3. cognitive drivers that augment Entity data.

Memory functions within the cortex or a given chip can combine with the Success center to measure the relative success of any given proposal. These memories may be used to modify that chip's vote in the future.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the combination of all its structures for the functions specified.

Figure 1:
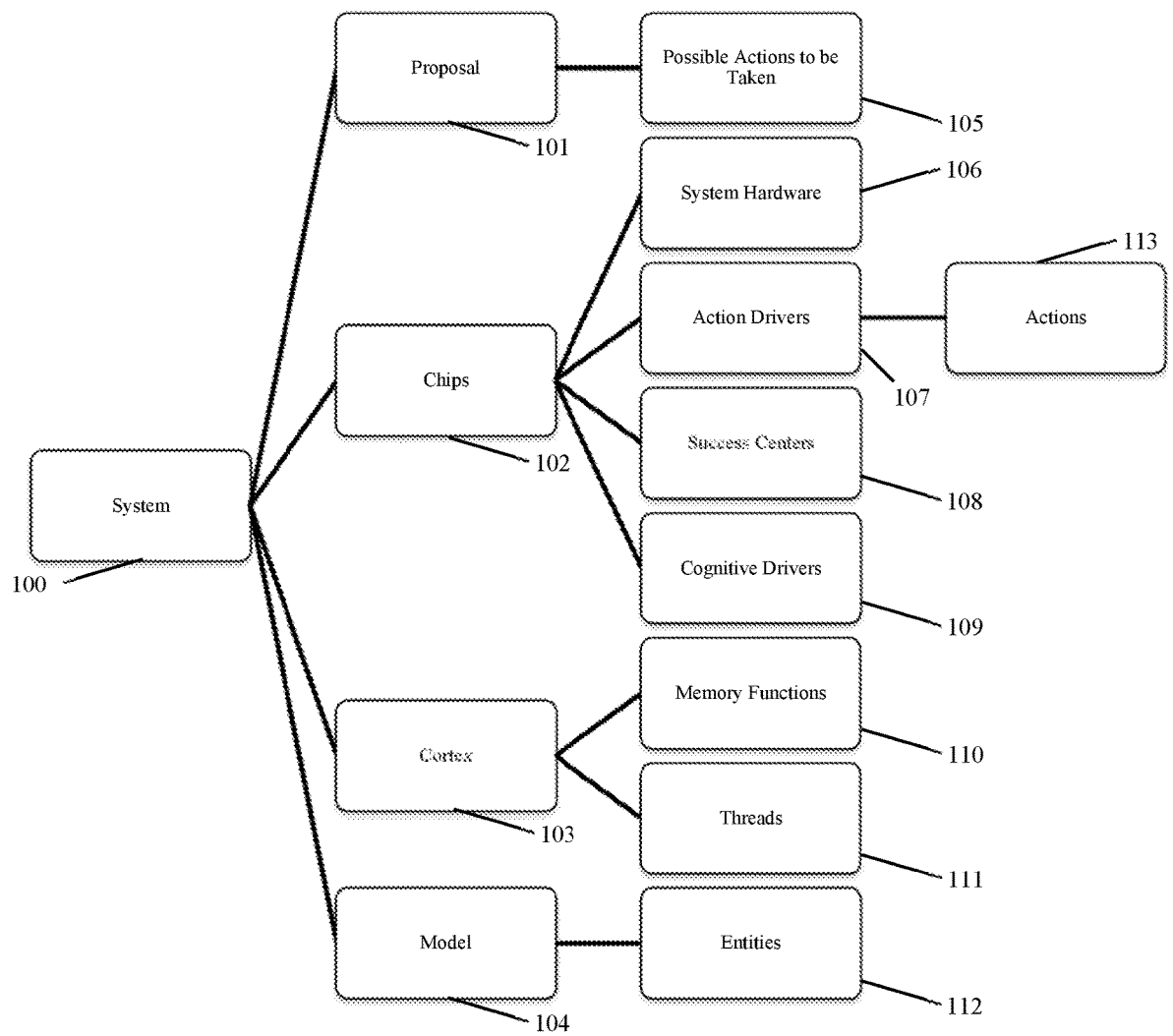
FIG. 1 is a diagram showing an apparatus for decision-making with centralized officiating and modification of decisions through success measurements as according to an embodiment of the present invention.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to the present invention, there is introduced a method for component-based decision-making with centralized officiating and the modification of those decisions through success measurements. For the purpose of clarity, all like elements mentioned in this description will have the same designations. The terms "method for component-based decision-making with centralized officiating and the modification of those decisions through success measurements", "method decision-making", "voting method", "method", "invention", and "present invention" may be used interchangeably. In addition to the functions, features, components, and abilities of the invention already discussed in this specification, the invention may also have, but not be limited to, the following features contained within the description below.

It is important to note that throughout this Description, any references to data gathered from a sensor, sensor input, or data used to generate a delta can refer to an algorithm performed using data gathered from a sensor, or sensor synthesis. In some embodiments of the present invention, it is necessary to interpret, filter, or synthesize raw data to properly understand the meaning of the data. That is, one or more actions may be performed on sensor data before decisions regarding the data are made.

Referring now to FIG. 1, there is shown a diagram showing the components in a system (100) for decision-making with centralized officiating and modification of decisions through success measurements as according to an embodiment of the present invention. The system (100) is a computer-based system comprising at least one processing unit capable of executing machine-language instructions. The system (100) further comprises at least one memory module that can be physically configured to enter a "read" mode wherein data is read from the memory. The memory module can also be physically configured to enter a "write" mode wherein data is written to the memory.

Within the system (100) a plurality of system (100) components may Propose (101) conflicting or concurrent resolutions. Each proposal (101) comprises one or more possible instructions (105) that may be taken. These instructions are called Actions (113) in reference to the present invention. The components of the system vote on each resolution and the winning resolutions are acted upon.

Each voting member of the system (100) is referred to herein as a chip (102). In an embodiment of the present invention, a chip (102) is a hardware component (106) of an autonomous delivery vehicle. chips (102) can include, but are not limited to, a sensor array, a laser device, a radar device, a GPS receiver, an odometer, an energy monitor, a wireless communication device, a sonar device, a video recording device, a rangefinder, a microphone, or the like.

Each chip (102) has an adjustable or tunable voting authority where vote=v [Vmin ... Vmax] with Vmin, Vmax typically=[−1 ... 1]. The adjustability of each chip's (102) provides system designers with the ability to modify the importance of each chip (102).

In an embodiment of the present invention, a system (100) is installed in an autonomous delivery vehicle. When making a decision, a battery monitor that monitors the battery charge level of the vehicle may be given a higher voting authority than an audio receptor. If the vehicle's battery is at low or critical levels, the battery monitor could outvote the audio receptor and cause the system to proceed regardless of hearing a dog bark. That is, the battery monitor's vote would have a higher authority and control the system's (100) decision instead of the audio receptor.

A singleton officiating member, called the cortex (103), manages the notification and voting process. When the cortex (103) loads, it inventories the chips (102) and spawns new threads (111) as necessary. Each chip (102) functions as an independent intelligence during voting.

A current representation of the entire system is stored in the model (104). The model (104) is a state storage system that tracks the existence and condition of a group of tracked data items called Entities (112). In an embodiment of the present invention, the Entities (112) are objects located within the environment of an autonomous delivery vehicle. An Entity (112) can be a dog, tree, pedestrian, vehicle, or the like.

The model (104) is managed by the cortex (103) but may be queried by any chip (102). chips (102) may also include constructs such as action drivers (107). action drivers (107) are sets of machine instructions that are executed by an electronic processing unit that cause system hardware (106) to perform certain functions. action drivers (107) can also be used to drive the hardware (106). The action drivers (107) allow chips (102) to not only suggest a proposal (101), but allow the chips (102) to perform Actions (113) if the proposal (101) passes the vote. The complete list of Actions (113) available to the system (100) is referred to, in some embodiments, as an Action vocabulary. The Action vocabulary is generated from all action drivers (107).

Success Centers (108) measure the success or positiveness of a particular situation. Success Centers (108) are used in the system (100) to determine whether the outcome of a proposal (101) was successful or not. If the proposal (101) was successful or failed, the success or failure of that proposal (101) is stored in the memory (110) of the cortex (103). The cortex (103) may, but is not required to, override the vote of chips (102) in another proposal (101) vote if the present situation or proposal (101) is similar to the proposal (101) stored in its memory (110).

Cognitive drivers (109) are sets of machine instructions that, when executed by an electronic processing unit, augment Entity (112) data. The Cognitive drivers (109) can be algorithms that analyze data gathered from a chip (102) and identify the Entity (112) that the system (100) has encountered.

Memory Functions (110) within the cortex (103) or a given chip (102) can combine with the Success Centers (108) to measure the relative success of any given proposal (101). These Memory Functions (110) may be used to modify that chip's (102) vote in the future.

Figure 2:
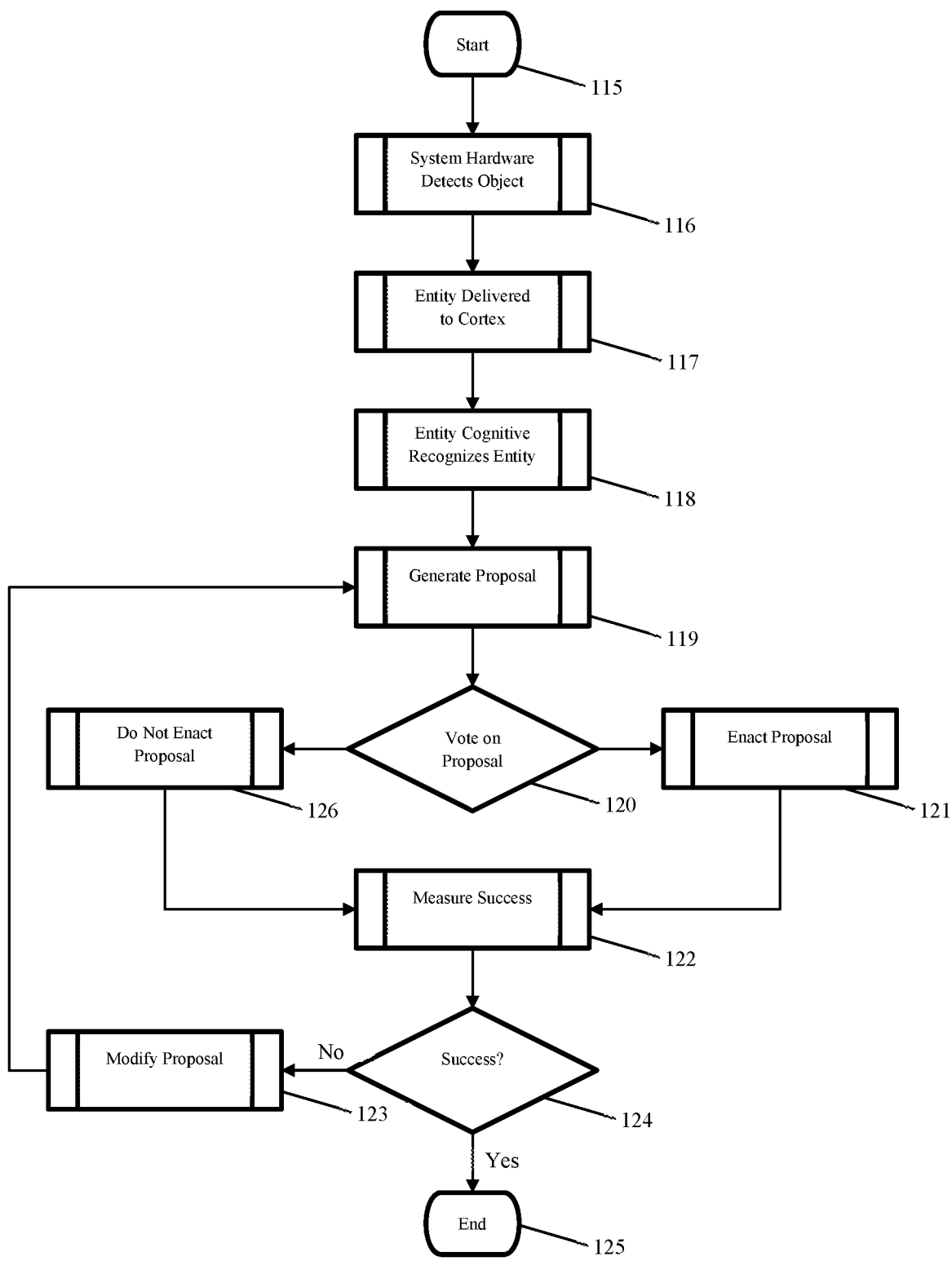
FIG. 2 is a flowchart showing the steps in a method for decision-making with centralized officiating and modification of decisions through success measurements as according to an embodiment of the present invention.

Referring now to FIG. 2, there is shown a flowchart with the steps in a method for decision-making with centralized officiating and modification of decisions through success measurements as according to an embodiment of the present invention. The method is executed on an electronic device that physically configures hardware components, such as electronic memory modules or system motors, into different operating modes in response to method steps. In an embodiment of the present invention, the execution of the method by the processing devices causes an electronic motor on an autonomous vehicle to cause the vehicle to move forward. In another embodiment of the present invention, the method causes a wireless communications device on an autonomous delivery vehicle to contact a human operator for further instructions.

The method starts (115) when system hardware detects an object (116) such as an entity described above in the discussion of FIG. 1. The entity is delivered to the cortex (117) and the cortex creates an event that the hardware has detected the entity. An entity cognitive within the system recognizes the entity that was detected (118). A chip within the system decides on an action to take, and generates a proposal (119) comprising the action. The chips within the system vote on the proposal (120).

If the proposal is voted in, it is acted upon (121). If the proposal is not voted in, it is not acted upon (126). The success of enacting or not enacting the proposal is measured (122) and the measurement stored within the system. If the decision whether to enact or not enact the proposal was successful (124), then the method ends. In an embodiment of the present invention, if the decision was not successful, another proposal can be generated but modified (123) using the success measurement from step 122. That is, the chip that generated the previous proposal can remember that the proposal was unsuccessful and generate an alternate proposal.

In another embodiment of the present invention, a system comprises only two chips: Delivery and Dog. Delivery's purpose is to deliver something. Dog's purpose is to avoid getting bitten. The following set of circumstances may ensue. Delivery proposes P containing actions $\alpha=[a_0, a_1, \ldots a_n]$ $(a_n \epsilon A)$ movement in the direction of some destination. Vote: Delivery votes 0.5, Dog votes 0 (neutral). Delivery proposal commences executing actions.

After some time, visual hardware detects an object. It delivers an Entity to the cortex, which bubbles an event that Dog has registered to receive: entity.add. The Dog Cognitive recognizes that it is seeing a dog and updated the Entity metadata. It decides that the solution is to run and proposes $P\neq'$ with $\alpha\neq'=[a\neq'_0, a\neq'_1, \ldots a\neq'_n]$ "run away". Vote: Delivery votes −0.5, Dog votes 1. proposal "Run away" begins Once the dog threat no longer exists, $P\neq'$ is complete and Delivery again proposes something like P. It is voted in again. The dog is encountered again, and again it is evaded. Delivery remembers that it has tried P twice with no success, both times being aborted by P≠'. It proposes P≡'' which uses a different route. This time, no dog is encountered and the delivery is successful.

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for re-mapping a safe and traversable route during delivery operations. Further, since numerous modifications and changes will readily occur to those skilled in the art, it is not desired to limit the method for re-mapping a safe and traversable route during delivery operations to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. A decision-making apparatus for an autonomous driving vehicle, the decision-making apparatus comprising:
   a plurality of interconnected chips, at least some of which include an associated hardware component, wherein each chip of the at least some is configured to execute an action through its associated hardware component, wherein the associated hardware component of each chip of at least a subset of the at least some is a sensor, and wherein the sensor is configured to gather entity data comprising information on the condition of at least one entity in an environment of the autonomous driving vehicle; and
   a singleton officiating member interconnected to the plurality of interconnected chips, wherein the singleton officiating member is configured to receive the entity data, wherein the singleton officiating member comprises a memory module, wherein the singleton officiating member is configured to write the entity data to and retrieve the entity data from the memory module, and wherein the singleton officiating member is configured to be queried for the entity data by the plurality of interconnected chips;
   wherein each chip of the subset is configured to send the entity data to the singleton officiating member; and
   wherein each chip of the plurality of interconnected chips is configured to query the singleton officiating member for the entity data and send a proposal to the singleton officiating member responsive to the query, wherein the proposal comprises at least one action to be taken by the autonomous driving vehicle;
   wherein the singleton officiating member is configured to notify each chip of the plurality of interconnected chips of the proposal, wherein each chip of the plurality of interconnected chips is configured to send a respective vote to the singleton officiating member upon notification of the proposal, and wherein each respective vote comprises a yes response, a no response, or a neutral response to the proposal; and
   wherein when the proposal passes, the proposal is executed by the autonomous driving vehicle, and when the proposal fails to pass, the proposal is not executed by the autonomous driving vehicle.

2. The decision-making apparatus of claim 1, wherein a model is stored on the memory module, and wherein the model is a state storage system that stores a current representation of the condition and the existence of each entity detected in the environment of the autonomous driving vehicle.

3. The decision-making apparatus of claim 1, wherein the entity comprises at least one of a person, an animal, an obstacle, or an object.

4. The decision-making apparatus of claim 3, wherein the at least one action is to be executed to avoid the entity.

5. The decision-making apparatus of claim 1, wherein each chip of the plurality of interconnected chips has a voting authority, wherein each chip of the plurality of interconnected chips has a purpose, wherein the voting authority is a numerical value ranging from −1 to 1, and wherein the numerical value of the voting authority is representative of an importance of the purpose of each chip to the autonomous driving vehicle.

6. A method of decision-making by a computer system for an autonomous driving vehicle, the method of decision-making comprising:
   detecting an entity in the environment of the autonomous driving vehicle using one or more sensors included in the computer system, wherein the entity comprises an obstacle to the autonomous driving vehicle;
   sending by at least one component of a plurality of interconnected components to a cortex in response to the detected entity a proposal that includes one or more actions for the computer system to execute to avoid the obstacle;
   notifying by the cortex each component of the plurality of interconnected components of the proposal;
   sending a respective vote by each component of the plurality of interconnected components to the cortex upon notification of the proposal, wherein each respective vote comprises a yes response, a no response, or a neutral response to the proposal;
   executing the one or more actions included in the proposal by the computer system through hardware that is associated with the plurality of interconnected components when the proposal passes; and
   causing the computer system to not execute the one or more actions included in the proposal through the hardware that is associated with the plurality of interconnected components when the proposal does not pass.

7. The method of claim 6, wherein the obstacle is an object, an animal, or a human.

8. The method of claim 6, wherein the proposal is a first proposal and the one or more actions are an initial set of one or more actions, and wherein the method further comprises;
   sending by the at least one component of the plurality of interconnected components to the cortex a new proposal that includes a new set of one or more actions to be executed by the computer system to avoid the obstacle when the obstacle is not avoided when the initial set of one or more actions is executed by the computer system, wherein the new set of one or more actions is different from the initial set of one or more actions.

9. The method of claim 8, further comprising causing the computer system to terminate the method respective to the entity when any set of one or more actions has avoided the obstacle.

10. The method of claim 9, further comprising causing the computer system to repeat the method with respect to a new entity when the method respective to the entity is terminated.

11. The method of claim 8, further comprising sending by the at least one component a subsequent proposal to the cortex when the obstacle is not avoided when a set of one or more actions included in a previous proposal is executed by the computer system, wherein the subsequent proposal includes a different set of one or more actions that is different from the set of one or more actions included in the previous proposal, and wherein the previous proposal and the subsequent proposal are to be executed by the computer system to avoid the obstacle.

12. The method of claim 8, further comprising causing the computer system to store action data when any set of one or more actions is executed by the computer system, wherein the action data includes information on whether the obstacle is avoided when any set of one or more actions is executed by the computer system, and wherein the action data includes information on whether the obstacle is not avoided when any set of one or more actions is executed by the computer system.

13. The method of claim 12, wherein the at least one component is configured to access the action data.

14. The method of claim 13, wherein the action data is used by the at the least one component to generate a subsequent proposal to avoid the obstacle.

* * * * *